US008333831B2

(12) United States Patent
van de Belt et al.

(10) Patent No.: US 8,333,831 B2
(45) Date of Patent: Dec. 18, 2012

(54) DISPERSION OF NANOPARTICLES IN ORGANIC SOLVENTS

(75) Inventors: Roelof van de Belt, Best (NL); Edwin Currie, Geleen (NL)

(73) Assignee: Chemip B.V., Geleen (NL)

( * ) Notice: Subject to any disclaimer, the term of this patent is extended or adjusted under 35 U.S.C. 154(b) by 187 days.

(21) Appl. No.: 12/681,954

(22) PCT Filed: Oct. 9, 2008

(86) PCT No.: PCT/EP2008/063552
§ 371 (c)(1),
(2), (4) Date: Aug. 23, 2010

(87) PCT Pub. No.: WO2009/047302
PCT Pub. Date: Apr. 16, 2009

(65) Prior Publication Data
US 2010/0311859 A1    Dec. 9, 2010

(30) Foreign Application Priority Data

Oct. 9, 2007  (EP) ..................................... 07118100

(51) Int. Cl.
| | | |
|---|---|---|
| C08K 3/22 | (2006.01) | |
| C08K 9/06 | (2006.01) | |
| C09D 1/00 | (2006.01) | |
| B32B 27/36 | (2006.01) | |
| B32B 27/06 | (2006.01) | |
| B32B 27/08 | (2006.01) | |
| B32B 23/08 | (2006.01) | |
| C08F 2/50 | (2006.01) | |
| C09D 5/24 | (2006.01) | |
| C09D 7/12 | (2006.01) | |
| C09D 133/06 | (2006.01) | |
| C09D 151/10 | (2006.01) | |

(52) U.S. Cl. ..................... 106/286.2; 428/483; 428/507; 428/515; 428/689; 428/412; 522/79; 522/84; 522/182; 522/77; 523/202; 523/212

(58) Field of Classification Search ............... 106/286.2; 522/83, 84, 182, 77, 79; 428/412, 520, 532, 428/689, 701, 515, 507, 483; 523/202, 212
See application file for complete search history.

(56) References Cited

U.S. PATENT DOCUMENTS

| | | | |
|---|---|---|---|
| 5,731,119 A * | 3/1998 | Eichorst et al. ................. 430/63 |
| 5,885,745 A * | 3/1999 | Marrocco, III ............ 430/270.1 |
| 6,921,576 B2 * | 7/2005 | Terauchi et al. .............. 428/404 |
| 7,632,568 B2 * | 12/2009 | Padiyath et al. .............. 428/328 |
| 8,080,309 B2 * | 12/2011 | Shinohara et al. ............ 428/212 |
| 2003/0068486 A1 * | 4/2003 | Arney et al. ................... 428/323 |
| 2005/0059766 A1 | 3/2005 | Jones et al. | |
| 2006/0127676 A1 * | 6/2006 | Sonezaki et al. .............. 428/412 |
| 2006/0154049 A1 | 7/2006 | Padiyath et al. | |
| 2010/0188196 A1 * | 7/2010 | Van De Belt et al. ........ 340/10.1 |

FOREIGN PATENT DOCUMENTS

| | | |
|---|---|---|
| EP | 1 666 552 | 6/2006 |
| WO | WO 03/022935 | 3/2003 |
| WO | WO 2006/054888 | 5/2006 |
| WO | WO 2006/136534 | 12/2006 |
| WO | WO 2007/089114 | 8/2007 |
| WO | WO 2008/061962 | 5/2008 |

OTHER PUBLICATIONS

International Search Report for PCT/EP2008/063552, mailed Mar. 2, 2009.
Posthumus et al., "Control of the electrical conductivity of composites of antimony doped tin oxide (ATO) nanparticles and acrylate by grafting of 3-methacryloxypropyltrimethoxysilane (MPS)", Journal of Colloid and Interface Science, vol. 304, No. 2, (Nov. 18, 2006), pp. 394-401.
Posthumus, W. et al., "Surface modification of oxidic nanoparticles using 3-methacryloxypropyltrimethoxysilane", Journal of Colloid and Interface Science, vol. 269, (Jan. 1, 2004), pp. 109-116.
Soloukhin, V.A. et al., "Conductive ATO-Acrylate Nanocomposite Hydrid Coatings: Experimental Results and Modeling", Journal of Polymer Science: Part B: Polymer Physics, (vol. 45, No. 16, (Aug. 15, 2007), pp. 2147-2160.

* cited by examiner

Primary Examiner — Susan W Berman

(74) Attorney, Agent, or Firm — Nixon & Vanderhye P.C.

(57) ABSTRACT

The invention relates to a dispersion of antimony or indium doped tinoxide nanoparticles in an organic solvent, comprising a) 5-75 wt % of nanoparticles having a mean average size between 1 and 100 nm. b) a solvent comprising a hydroxyl group and an ether group. c) a water content of less then 15 wt %. d) a dispersant content of less then 0.1 wt %. The invention also relates to a method of making such a dispersion, by I. Making a mixture of an aqueous dispersion of antimony or indium doped tinoxide particles having an average size between 1 and 100 nm, a solvent comprising a hydroxyl group and an ether group, which forms an azeotrope with water, and a grafting compound. II. Heating the mixture under stirring at a temperature between 20 and 150° C. III. At least partially removing the solvent/water mixture. IV. Optionally adding more solvent. V. Repeating steps III and IV till the water content of the obtained dispersion is less then a desired value and the concentration solid is between 5 and 70 wt %.

13 Claims, No Drawings

DISPERSION OF NANOPARTICLES IN ORGANIC SOLVENTS

This application is the U.S. national phase of International Application No. PCT/EP2008/063552 filed 9 Oct. 2008, which designated the U.S. and claims priority to EP Application No. 07118100.2 filed 9 Oct. 2007, the entire contents of each of which are hereby incorporated by reference.

FIELD OF THE INVENTION

The present invention relates to dispersions of antimony or indium doped tinoxide nanoparticles in organic solvents, the use of the nanodispersions in the preparation of coating compositions, the use of said compositions, cured films and articles comprising coatings containing the nanoparticles with antistatic and or heat absorbing properties.

Dispersions of nanoparticles in organic solvents are known in the art. These dispersions are prepared by adding different kinds of dispersants to the nanoparticles. EP1008564 A2/WO2006-016729 (Sumitomo Osaka Cement) discloses preparation of nanodispersions containing ITO and ATO powders using 1-10 w % dispersion agent. JP9108621 (Nippon Kayaku) shows the use of carboxylic acids as dispersion agents for ATO and ITO nanopowders. WO2004-039891 (JSR) teaches the use of polyvinylbutyral to disperse SiO2 coated TiO2 in an organic solvent. JP08067837 A (Mitsubishi Materials Corporation) teaches the application of dialkyl phosphite titanate as a dispersing agent for ATO.

In a further step it may be possible to graft the nanoparticles in the presence of the dispersant agents with compounds having reactive groups. For instance, in WO2006-054888 A2 (JSR/DSM) zirconium oxide, antimony oxide and zinc doped antimony oxide are grafted with a silane coupling agent to provide dispersability and reactivity in a UV curable resin.

All dispersions from nanoparticles in organic solvents known in the art have considerable amounts of dispersants present. These dispersants show a number of disadvantages. The dispersants are surface active compounds and can impart undesirable properties to the coating formulation. For instance, the dispersion agents can bloom to the surface and affect adhesion of the coating to the substrate or optical quality of the coated product.

Also a milling step is generally used to make the nanodispersion. This milling step is time consuming and may lead to a low quality of the nanodispersion, i.e. a large amount of micron-sized particles may be present after the milling step. The presence of micron-sized particles will result in defects and low optical quality of the coated substrates.

UV curable coatings comprising metaloxides with grafted surface groups are known in the art (for example US 2005/059766). Such coatings can comprise siliconoxide, tinoxide or zirconiumoxide to provide a high optical clarity together with good scratch resistance. However, such coatings do not provide additional functionalities such as electrical conductivity or heat absorption properties. For such functionalities other nanoparticles and dispersion techniques are required, for instance carbon nanotubes or graphite. Combination of the optical clarity of the metal oxides with the electrical or heat absorption functionalities is often cumbersome, and not trivial within a single coating composition.

In the case that multiple functionalities are desired from coatings containing the nanoparticles, the use of dispersants will have an even larger disadvantage. An example of coatings having multiple functionalities is coatings providing electrical conductivity together with excellent optical clarity. A second example is coatings providing heat absorption together with excellent optical clarity.

There is therefore a need for high quality coatings comprising surface modified nanoparticles with excellent optical quality combined with properties like antistatic or electrical conductivity and or heat absorption. Such properties may be strongly negatively affected by the presence of dispersing agents in the coating resulting from the use of nanodispersions.

It is an object of the present invention to provide dispersions and coating compositions that do provide a combination of optical clarity and electrical and or heat absorption functionality. It is further an object of the present invention to provide compositions that provide a combination of optical clarity and electrical and or heat absorption functionality together with a high coating hardness.

The present invention relates to a dispersion of antimony or indium doped tinoxide nanoparticles in an organic solvent, comprising
  a) 5-75 wt % of particles having a mean average size between 1 and 100 nm
  b) A solvent comprising a hydroxyl group and an ether group
  c) A water content of less then 15 wt %
  d) A dispersant content of less then 0.1 wt %

The invention also relates to a method of making these nanodispersions, to the preparation of coating compositions, the application of coating compositions on substrates and to the substrates having high quality coatings comprising said nanoparticles.

Hereinafter antimony or indium doped tinoxide is abbreviated as ATO/ITO.

In a preferred embodiment of the invention, the nanoparticles contain antimony doped tinoxide (ATO).

The invention provides a method to prepare ATO/ITO nanodispersions with latent reactive groups in an organic solvent without the use of dispersion agents. These nanodispersions in an organic solvent with latent reactive groups can be used in coating compositions in which the latent reactive groups can react with (part of) the reactive groups in the coating composition.

DETAILED DESCRIPTION OF THE INVENTION

The nanodispersions of the present invention comprise ATO/ITO nanoparticles, an organic solvent, low amounts of water and substantially no dispersants.

These ATO/ITO nanoparticles may enhance the scratch resistance of the coated substrate, change the refractive index of the coating composition, reduce the reflection of the coated substrate, provide absorption of light in a certain wavelength regime give conductivity to the coating or can act as an IR-absorption layer.

In one embodiment of the present invention the ATO/ITO nanodispersions and coating compositions thereof provide electrical conductivity to the coated substrate. In this case the coated substrate may be antistatic (surface resistivity between $10^7$-$10^{10}$Ω/□), EMI shielding ($10^5$-$10^7$Ω/□) or conductive (surface resistivity below $10^5$Ω/□).

In another embodiment of the present invention the ATO/ITO nanodispersions and coating compositions thereof absorb light in a certain wavelength range. For example the nanoparticles may provide absorption in the UV range (i.e. wavelengths below 400 nm) or in the (near) infrared range (NIR) (wavelengths above 900 nm).

It has surprisingly been found that the ATO/ITO particles combine excellent optical clarity with either the antistatic functionality, the UV and NIR absorption or both.

The nanoparticles preferably have a small size in view of the optical appearance of the layer prepared from the composition. Preferably the particles have a mean average size (measured with dynamic light scattering in a suitable solvent according to ASTM 4519.1) between 1 and 100 nm, more preferably a mean average size between 5 and 50 nm. The nanoparticles may have any shape or form. Such shapes include platelets, rods, spheres, beads, hollow or filled particles and the like.

The nanoparticles comprise organic surface groups. The amount of surface groups may be varied depending on the application of the nanodispersion. The surface groups may contain reactive groups that react with other ingredients of the coating composition or substrate, for example after irradiation with UV-light or thermal excitation. The organic surface groups are connected to the nanoparticles by reaction of the nanoparticles with grafting compounds having a hydrolysable silyl group. The hydrolysable silyl group present in the grafting compound is preferably a silanol group or a group that produces a silanol group by hydrolysis. Examples of groups that produce a silanol group after hydrolysis are an alkoxy group, aryloxy group, acetoxy group, amino group or a halogen atom that are bonded to a silicon atom. Specifically, a grafting compound containing an alkoxysilyl group or an aryloxysilyl group is preferable. As the alkoxy group, alkoxy groups containing 1-8 carbon atoms are preferable; and as the aryloxy group, aryloxy groups containing 6-18 carbon atoms are preferable.

Examples of silane compounds are alkylalkoxysilanes such as methyltrimethoxysilane, methyltriethoxysilane, trimethylmonomethoxysilane and phenyltrimethoxysilane compounds, cyclic alkylsilanes such as cyclohexanetrimethoxysilane, and alkylacetoxy silanes such as acetoxytrimethylsilane. These compounds may be used either individually or in combination of two or more. Also use of alkylalkoxysilanes with fluor groups to impart hydrophobicity is possible.

Specific examples of reactive groups present in alkoxy silane compounds are (meth)acrylate compounds, vinyl compounds, phosphate compounds, styrene compounds, epoxy compounds, amine compounds, (blocked) isocyanate compounds, cyano compounds, succinic imidyloxy compounds, urethane compounds and mercapto compounds Specific examples are methacryloxypropyltrimethoxysilane, acryloxypropyltrimethoxysilane, and vinyltrimethoxysilane; glycidoxypropyltriethoxysilane and glycidoxypropyltrimethoxysilane; aminopropyltriethoxysilane and aminopropyltrimethoxysilane; mercaptopropyltrimethoxysilane and mercaptopropyltriethoxysilane. Of these, methyltrimethoxysilane, methyltriethoxysilane, glycidoxypropyltrimethoxysilane, vinyltrimethoxysilane and methacryloxypropyltrimethoxysilane are preferable from the viewpoint of dispersion stability of the surface-treated oxide particles.

In another embodiment silanes with more than three hydrolysable silyl groups can be used, such as bipodal alkoxy silanes or hyperbranched silanes.

The weight percentage nanoparticles in dispersion in the organic solvent can be 5-70 wt %, relative to the total of the dispersion. Preferably the amount of nanoparticles is 8-60 wt %, more preferably 12-50 and in one embodiment of the invention between 20 and 40 wt %.

Weight percentages in the present specification in general relate to the total of the components, including water and solvent, unless expressly stated otherwise. The amount of grafting compound is expressed as a weight percentage relative to the amount of nanoparticles.

The nanodispersion contains an organic solvent, which forms an azeotrope with water. The organic solvent is a compound comprising one hydroxyl group and one ether group. Preferably the organic solvent comprises between 3 and 8 carbon atoms, preferably between 3 and 5 carbon atoms. The organic solvent preferably has a boiling point below 150° C., more preferably the boiling point is below 130° C. The solvent forms an azeotrope with water, wherein the amount of water is preferably at least 32 wt %, more preferably at least 40 wt %, and still more preferably more then 45 wt %.

The organic solvent preferably is chosen from the group consisting of 1-methoxy-2-propanol, 2-methoxy-1-propanol, 3-methoxy-1-butanol, and 2-methoxy-ethanol. Most preferably the solvent is 1-methoxy-2-propanol.

The organic solvent may be used as a single component or combinations of solvents that form an azeotrope may be used. The amount of organic solvent typically ranges between 30 and 95 wt % of the dispersion.

The nanodispersion may contain water. It has been found that presence of water has an influence on the amount of nanoparticles that can be dispersed in the organic solvent.

The amount of water present in the dispersions is typically lower then 15 wt %, preferably lower then 10 wt %, more preferably lower then 5 wt %. When very high concentrations of nanoparticles are desired, the stability of the dispersion can be enhanced by tailoring the amount of water in the dispersion.

An important factor is the stability of the dispersion. An unstable dispersion can form an undesirable gel phase, the nanoparticles may precipitate or settle, or micron size agglomerates may form in the dispersion that negatively affect the properties of the coating composition and coated substrate. The stability of the dispersions of oxide particles in organic solvent depends on the concentration of oxide particles, the amount of surface modification and amount of residual water present. In general, a higher percentage of surface modification yields a more stable dispersion, and also the presence of water can have a stabilizing effect on the dispersion. If the amounts of grafting agent are too low, the nanodispersion will tend to destabilize and form a gel.

The amount of grafting compound to be added to the nanoparticles to obtain stable dispersions ranges between 2 and 40 wt % (relative to the weight of the nanoparticles). For dispersions of nanoparticles in organic solvent containing between about 10 and about 25 wt % nanoparticles, the amount of grafting compound preferably ranges between 3 and 20 wt % (relative to nanoparticles). For dispersions in organic solvent containing more then 25 wt % nanoparticles the amount of grafting compound preferably ranges between 5 and 35 wt % (relative to nanoparticles).

The optimum amount of grafting compound to be added to the nanoparticles may depend on the residual amount of water present in the dispersion. If the residual amount of water is higher, the amount of grafting compound may be lower, or in the lower part of the preferred ranges mentioned above.

The nanodispersions according to the invention have substantially no dispersant. In this specification a dispersant is meant to be any substance added to improve the stability of the nanoparticle dispersion. The dispersant may be added to the nanoparticles in the dispersion, to dry nanoparticles prior to forming a dispersion or to the coating formulation comprising the nanodispersion. In general the dispersants have an apolar and a polar part in the molecule and do not chemically react with the nanoparticles, but rather have a physical interaction with the nanoparticles. Dispersants are generally known to the skilled man in the art. Preferably the amount of dispersant present in the dispersion is less then 0.1 wt % (relative to the total of the dispersion), more preferably less then 0.01 wt %, even more preferably less then 0.005 wt %, most preferably less then 0.001 wt %.

At present no process is known in the art that can produce stable nanodispersions, having a high solids content but substantially no dispersant. Therefore the present invention also relates to a novel process for making dispersant free nanodispersions in organic solvents.

The process for preparing the nanodispersion contains the steps of

I. Making a mixture of an aqueous dispersion of ATO/ITO particles having an average size between 5 and 100 nm, an organic solvent comprising a hydroxyl group and an ether group, which forms an azeotrope with water, and a grafting compound II. Heating the mixture under stirring at a temperature between 20 and 150° C.

III. At least partially removing the solvent/water mixture,

IV. Optionally adding more solvent

V. Repeating steps III and IV till the water content of the obtained dispersion is less then a desired value and the concentration of solids in the nanodispersion is between 5 and 70 wt %.

The aqueous dispersion of nanoparticles used in step I preferably also does not contain dispersants, since removal of dispersants from nanodispersions is generally very difficult. Preferably the amount of dispersant in the aqueous dispersion is below 0.01 wt %, more preferably below 0.001 wt %. The aqueous dispersion may preferably contain between 5 and 25 wt % of particles. The amount of grafting compound in step I depends on the amount of surface modification that is desired. The reaction of grafting compound with the oxide particles is considered to be quantitative when low amounts of grafting agent are used. When higher amounts (for example higher then 10 wt %) of grafting compound are used, it is possible that residual grafting compounds will remain in the dispersion of nanoparticles in organic solvent. The residual grafting compounds may have taken part in side reactions, where they couple to each other and form silanes. These silane coupling products are not considered to be dispersants for the nanoparticles.

The amount of organic solvent to be added in the first step of the process depends on the product to be made. The ratio of water present in the aqueous dispersion of ATO/ITO nanoparticles to organic solvent, comprising a hydroxyl group and an ether group in step I, generally ranges between 0.1 and 10, preferably between 0.2 and 6, more preferably between 0.3 and 5.

In one embodiment of the invention it is preferred to prehydrolyse the grafting compound before adding the grafting compound to the nanoparticles. The prehydrolysis can be performed by mixing the grafting compound with water, the organic solvent and reacting this at temperatures between 30 and 90° C. Optionally some acid or base can be added to catalyse the reaction.

The reaction time of step II of the process of the invention generally ranges between 10 minutes and 24 hours. It is preferred that the reaction time is long enough to enable the grafting compound to react (possibly after hydrolysis) with the nanoparticles. If the reaction time is too short, the (hydrolyzed) grafting compound may evaporate from the mixture in step III of the process, whereby the amount of surface modification of the particles becomes uncertain, and stability of the dispersion may be negatively affected. Preferably the reaction time is between 30 minutes and 20 hours. A long reaction time has not a negative effect on the quality of the dispersion, except for a less economic process. Longer reaction times than 24 hours are possible.

The reaction temperature of step II generally ranges between room temperature and 150° C., preferably between 40 and 95° C., more preferably between 50 and 90° C.

Step III of the process lowers the amount of water of the dispersion to a desired level. This may (preferably) be performed by distilling off the azeotrope mixture of organic solvent with water, optionally under reduced pressure. Other solvent removal processes known in the art can also be used. Depending on the amounts of water and organic solvent present in step I, it may be needed to add more organic solvent (step IV) and repeat step III to arrive at the desired water content. It is also possible to add a different solvent in step IV, whereby a dispersion can be obtained having different solvents depending on the intended application. The process to prepare the nanodispersion can be performed batchwise but also in a (semi-)continuous way.

The nanodispersion of the present invention can be used to make for example coating compositions.

The coating composition can contain different components like for example (crosslinked) polymers, and/or reactive diluents. The reactive groups in the reactive diluents may be for example acrylate, methacrylate, vinyl, epoxy, amine, urethane, isocyanate, silanol or hydroxyl groups. There are no limitations to the amount of reactive diluents and their combinations. In the case that the nanoparticles in the nanodispersion have reactive surface groups, it is preferable that part of the reactive diluents react with the surface groups of the nanoparticles.

In one preferred embodiment of the present invention, the groups are acrylate and/or methacrylate groups. As examples of suitable compounds having (meth)acrylate groups can be mentioned trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, glycerol tri(meth)acrylate, tris(2-hydroxyethyl) isocyanurate tri(meth)acrylate, ethylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth) acrylate, tricyclodecanediyldimethanol di(meth)acrylate, poly(meth)acrylates of ethylene oxide or propylene oxide addition product of a starting alcohol used to produce these compounds, oligoester(meth)acrylates having at least two (meth)acryloyl groups in the molecule, oligoether(meth)acrylates, oligourethane(meth)acrylates, oligoepoxy(meth)acrylates, and the like can be given.

Initiators can be used to catalyse the cure of the coating composition. These can be either thermally activated or activated by actinic radiation. In the present invention, actinic radiation refers to visible rays, ultraviolet rays, deep ultraviolet rays, X-rays, electron beams, and the like. As examples of a photoinitiator 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2chlorothioxanthone, 2-methyl-1-[4-(methylthio) phenyl]-2-morpholino-propan-1-one, 2,4,6-trimethylbenzoyidiphenylphosphine oxide, bis-(2,6-dimethoxybenzoyl)-2,4,4 trimethylpentylphosphine oxide, and the like can be given. The initiator may be added in an amount of preferably 0.01-5 parts by weight, and still more preferably 0.1-3 parts by weight relative to the total composition.

The coating composition may contain additional components. Examples of additional components include, but are not limited by, coinitiators or synergists, antioxidants, antistatic agents, light stabilizers, inhibitors, levelling agents, non-reactive polymers, surfactants, and lubricants.

In a first embodiment the coating compositions can contain other organic solvents, like for example water, alcohols, ketones, ethers, esters, alkanes, cyclic solvents, aromatic solvents or halogenated solvents. The skilled person is able to determine which solvents provide the optimum result.

In a second embodiment the coating composition contains no solvent, save for (part) of the solvents of the nanodispersion, for example powder coating compositions, containing at least one resin and a crosslinker. The resin can be a functional polymer, like for example a polyester resin, a polycarbonate or any other resin known to the skilled man in the art. The nature of the crosslinker is determined by the nature of the functional groups in the resin. The functional groups on the crosslinker must be able to react with the functional groups in the resin. Examples of crosslinkers are epoxy resins, polyamines, isocyanates, amino resins, polycarboxylic acids, acid anhydrides, polyphenols, Primid(R)-like compounds and combinations of any of them. Depending on the nature of the functional groups in the resin, the crosslinker will be chosen so as to react with the functional groups of the resin. The composition comprising at least the resin and the crosslinker will be cured. This curing process is well known to the man skilled in the art of making coatings. Examples of curing processes are thermal curing, curing with electromagnetic radiation, such as for example UV- or electron beam curing. Depending on the nature of the functional groups it is also possible to use two (dual-cure) or more types of curing processes.

There are no specific limitations to the method of applying the composition. For example, a conventional method such as a roll coating method, spray coating method, flow coating method, dipping method, screen printing method, or ink jet printing method may be used.

There are no specific limitations to the substrates to which the coatings comprising the nanodispersions are applied. The substrates include a metal, ceramics, glass, plastic, wood, slate, or the like without specific limitations. As a material for making use of high productivity and industrial applicability of radiation curability, it is preferable to apply the cured film to a film-type or sheet-type substrate. A plastic film or a plastic sheet is a particularly preferable material. As examples of plastic, polycarbonate, polymethylmethacrylate, polystyrene/polymethylmethacrylate copolymer, polystyrene, polyester, polyolefin, triacetylcellulose resin, diallylcarbonate of diethylene glycol(CR-39), ABS resin, AS resin, polyamide, epoxy resin, melamine resin, cyclic polyolefin resin (norbornene resin, for example), and the like can be given. The coating comprising the nanodispersions can be applied directly to the substrate or after a processing step. Such steps may be, for example, a cleaning step, corona treatment, a sputtering step during which an inorganic layer is deposited or a saponification step in an alkaline solution.

The invention also relates to the coated substrate. The coated substrate is generally obtained by applying the coating composition of the present invention onto the substrate, allow evaporation of solvent (if present), followed by cure of reactive monomers.

The nanodispersions can be applied in coatings to give substrates desired functionalities. In a first embodiment the coatings can be used as scratch protective coatings for plastic films, plastic sheets, polarisers, plasma display films, CD's and DVD's. In another embodiment the coatings can provide antistatic, EMI shielding or conductive properties to the coated substrates. These may be applied in safety applications, clean rooms, electronic films, RFID films or specialty packaging. In another embodiment the coatings provide absorption in the UV or NIR regime together with a high transparency in the visible regime. These may be applied in climate control films, architectural or automotive window films or UV absorptive films for decreased yellowing and degradation. In another application the coatings provide refractive index control. These coatings may be applied in lens applications, antireflective films, and high optical clarity films for display applications.

In a preferred embodiment the coatings comprising the ATO/ITO nanodispersions give the coated substrates a combination of two or more functionalities. For instance, doped metal oxide nanodispersions in a suitable acrylate binder may provide both a high scratch protection, high transparency and antistatic functionality. Such antistatic hardcoats may be applied in the display industry or high-end optical films. In another embodiment doped metal oxide dispersions in a suitable binder can provide a high scratch resistance together with NIR absorption. Such IR blocking hardcoats may be applied on climate control films.

EXAMPLES

The present invention is illustrated by the following examples, which should not be considered limiting to the scope of the present invention.

Example 1

Preparation of Nanodispersion D1

2.73 gr 3-methacryloxypropyl trimethoxy silane (Dynasylan MEMO from Degussa) is dissolved in 218.6 gr 1-methoxy-2-propanol (1M2P from Merck). 510.9 gr 12.0 w % aqueous ATO dispersion (ATO-12%-AQ (free of dispersants) from Nano Specials B.V., the Netherlands; average particle size 25 nanometer) and 445.6 gr 1M2P. After mixing both solutions an additional amount of 367.2 gr 1M2P was added. The ratio water/1M2P is 0.44. The obtained mixture was heated for 16 hr at 75 C and subsequently filtered. The dispersion is concentrated under reduced pressure in a rotavapor with addition of extra 1M2P until the remaining dispersion contains 9.57 w % solids and the water content was <5%. The amount of MEMO was 4.5% relative to the weight of nanoparticles.

Example 2

Preparation of Nanodispersion D2

902.3 gr 20 w % aqueous ATO dispersion (ATO3-20%-AQ (free of dispersants) from Nano Specials B.V., The Netherlands; average particle size 17 nanometer) was mixed with 289.9 gr 1M2P. 58.66 gr MEMO was dissolved in 247.1 gr 1M2P. After mixing both solutions an additional amount of 345.6 gr 1M2P was added. The ratio water/1M2P is 0.82. The obtained dispersion was heated for 16 hr at 75 C and subsequently filtered. The filtered dispersion was concentrated under reduced pressure in a rotavapor and additional 1M2P was added until the remaining dispersion contained 39.1 w % and the water content was determined <5%.

The amount of MEMO was 32.5% relative to the weight of nanoparticles

Experiment 3

Preparation of Nanodispersion D3

9.73 gr MEMO was dissolved in 116.4 gr 1M2P. 388.6 gr aqueous tin oxide (TO-21%-AQ (free of dispersants) from Nano Specials B.V.; average particle size 8 nanometer) was diluted with 86.2 gr 1M2P. After mixing both solutions an additional amount of 182.67 gr 1M2P was added. The ratio water/1M2P is 0.80. The obtained dispersion was heated 16 hr at 74 C and subsequently filtered. The dispersion was concentrated under reduced pressure in a rotavapor and additional 1M2P was added until the final solid content was 24 w %.

The amount of MEMO was 12.1% relative to the weight of nanoparticles

Example 4

Coating Formulations C1-C3

UV curable coating formulations were prepared with the dispersions D1-D3 according to table 1. The amounts are given in w %, the PETIA (mixture of tri and tetra acrylated pentaerythritol) was obtained from Cytec, the SR399 (dipentaeritrythol pentaacrylate) from Sartomer, Irgacure 184 (1-Hydroxy-cyclohexyl-phenyl-ketone) from Ciba, Byk 3500 (silicon leveling agent) from Byk Chemie, the solvents from VWR.

TABLE 1 coating formulations C1-C3.
Coating composition

|  | C1 | C2 | C3-comparitive |
|---|---|---|---|
| Dispersion | D1 | D2 | D3 |
| Metaloxide | ATO/ITO | ATO/ITO | tinoxide |
| Amount dispersion | 18.1 | 50 | 80 |
| SR399 | 30.48 | — | 4.32 |
| PETIA | — | 47 | — |
| Irgacure 184 | 1.52 | 2.50 | 0.36 |
| Byk 3500 | 0.16 | 0.20 | 0.40 |
| 1M2P | 33.55 | 0.30 | 14.9 |
| Isopropyl alcohol | 16.3 | — | — |

All amounts are weight percentages relative to the total of the composition.

Example 5

Preparation of Films Coated with UV Coatings C1-C3

Coated films were prepared of coatings C1-C3 in the following identical manner. The coatings were applied on PET film (112 micron thick, DuPont-Teijin) using a Meyer rod #18. The coated substrates were placed in an oven of temperature 80° C. and subsequently placed under a UV lamp (Fusion D-lamp, 500-600 mJ/cm$^2$).

Example 6

Characterisation of PET Films with Coatings C1-C3

The transmission films were inspected visually for defects and appearance. The haze of the coated substrate was measured using a Byk-Gardner Haze-guard plus. The surface resistivity was measured using an IM6 Megohmeter with a ring electrode. The pencil hardness was measured according to ASTM D3363. The ranking starts at low hardness (4B, 3B, 2B, 1B, HB, F) towards higher hardness (H, 2H, 3H etc). The adhesion was measured in the crosscut test according to D3359-02. The coating thickness and refractive index was measured using a Micropack NanoCalc2000. The UV and visible transmission spectrum was measured using a Unicam UV4. The heat absorption of the respective films is measured by exposing a 56×140 mm coated film with 300 Watt IR-lamp at a distance of 220 mm. The temperature gradient behind the film is measured with thermo couples. Results of the temperature increase directly behind the film after 5 minutes of exposure is shown in the table. A high temperature rise shows the inability of the coating to stop the IR-radiation. A low temperature rise indicates a good absorption of NIR-irradiation by the coating on the film.

|  | PET with coating | | |
|---|---|---|---|
|  | C1 | C2 | C3-comparitive |
| Appearance | Clear, no defects | Clear, no defects | Clear, no defects |
| Thickness (micron) | 3.7 | 4.2 | 2.2 |
| Adhesion | 100% | 100% | 100% |
| Transmission | 91% | 80% | 88% |
| Haze | 0.8% | 0.7% | 1.0% |
| Pencil | 2H | 2H | H |
| Surface resistivity | 5 10$^8$ Ω/□ | >10$^{11}$ Ω/□ | >10$^{11}$ Ω/□ |
| Refractive index | 1.51 | — | 1.66 |
| Temperature rise (° C.) | 4.2° C. | 2.2° C. | 7.2° C. |

The low haze values of all coatings C1 to C3 on PET and excellent appearance demonstrates an excellent dispersability. Non-grafted dispersions used in the same mixtures show high haze values and a high number of defects. Coating C1 demonstrates the combination of antistatic functionality with high hardness and reasonable ability to block IR-radiation. Coating C2 demonstrates the combination of high NIR absorption with high hardness.

Comparative coating C3 has an excellent appearance, reasonable pencil hardness, but does not show the low surface resistivity or absorption of NIR-radiation.

The invention claimed is:
1. A dispersion of antimony doped tinoxide nanoparticles in an organic solvent, comprising:
  a) 25-75 wt % of nanoparticles having a mean average size between 1 and 100 nm and modified with 5-35 wt %, relative to the particles, of an alkoxysilane selected from the group consisting of methyltrimethoxysilane, methyltriethoxysilane, glycidoxypropyltrimethoxysilane, vinyltrimethoxysilane and methacryloxypropyltrimethoxysilane;
  b) a solvent comprising a hydroxyl group and an ether group, wherein the solvent is selected form the group consisting of 1-methoxy-2-propanol, 2-methoxy-1-propanol, 3-methoxy-1-butanol and 2-methoxy-ethanol;
  c) water which is present in an amount of less than 15 wt %;

d) a dispersant which is present in an amount of less than 0.1 wt %.

2. The dispersion according to claim 1, wherein the dispersant is present in an amount of less then 0.0005 wt %.

3. A process for making the dispersion of antimony doped tinoxide nanoparticles in an organic solvent comprising:
- a) 25-75 wt % of nanoparticles having a mean average size between 1 and 100 nm and modified with 5-35 wt %, relative to the particles, of an alkoxysilane selected from the group consisting of methyltrimethoxysilane, methyltriethoxysilane, glycidoxypropyltrimethoxysilane, vinyltrimethoxysilane and methacryloxypropyltrimethoxysilane;
- b) a solvent comprising a hydroxyl group and an ether group, wherein the solvent is selected form the group consisting of 1-methoxy-2-propanol, 2-methoxy-1-propanol, 3-methoxy-1-butanol and 2-methoxy-ethanol;
- c) water which is present in an amount of less then 15 wt %;
- d) a dispersant which is present in an amount of less then 0.1 wt %, wherein the process comprises the steps of:
- I. making a mixture of an aqueous dispersion of antimony doped tinoxide particles having an average size between 1 and 100 nm, a solvent comprising a hydroxyl group and an ether group, which forms an azeotrope with water and is selected form the group consisting of 1-methoxy-2-propanol, 2-methoxy-1-propanol, 3-methoxy-1-butanol and 2-methoxy-ethanol, and a grafting compound which is an alkoxysilane selected from the group consisting of methyltrimethoxysilane, methyltriethoxysilane, glycidoxypropyltrimethoxysilane
- II. heating the mixture under stirring at a temperature between 20 and 150° C.;
- III. at least partially removing the solvent/water mixture;
- IV. optionally adding more solvent comprising a solvent selected form the group consisting of 1-methoxy-2-propanol, 2-methoxy-1-propanol, 3-methoxy-1-butanol and 2-methoxy-ethanol; and
- V. repeating steps III and IV untill the water content of the obtained dispersion is less then a desired value and the concentration solid is between 25 and 75 wt %.

4. The process according to claim 3, wherein the ratio of water to organic solvent in step I ranges between 0.1 and 10.

5. The process according to claim 3, wherein the ratio of water of the aqueous dispersion of nanoparticles to organic solvent in step I ranges between 0.3 and 4.

6. A coating composition comprising a dispersion according to claim 1.

7. The coating composition according to claim 6, wherein the composition comprises a curable component.

8. The coating composition according to claim 7, wherein the curable component is a UV curable component, and wherein the composition comprises a photoinitiator.

9. The coating composition according to claim 8, wherein the UV curable component is a compound having (meth) acrylate groups.

10. A process for preparing a coating on a substrate comprising the step of applying the coating composition according to claim 6 onto the substrate.

11. The process according to claim 10, wherein the substrate is a triacetylcellulose film.

12. The process according to claim 10 wherein the substrate is a polyester, polycarbonate or polymethacrylic film.

13. A coated film comprising a coating derived from drying and curing a coating composition according to claim 8 on a substrate.

* * * * *